US007865071B2

(12) United States Patent
Baarman

(10) Patent No.: US 7,865,071 B2
(45) Date of Patent: Jan. 4, 2011

(54) HEATING SYSTEM AND HEATER

(75) Inventor: David W. Baarman, Fennville, MI (US)

(73) Assignee: Access Business Group International LLC, Ada, MI (US)

(*) Notice: Subject to any disclaimer, the term of this patent is extended or adjusted under 35 U.S.C. 154(b) by 689 days.

(21) Appl. No.: 11/854,167

(22) Filed: Sep. 12, 2007

(65) Prior Publication Data

US 2008/0037966 A1 Feb. 14, 2008

Related U.S. Application Data

(62) Division of application No. 11/015,275, filed on Dec. 17, 2004, now abandoned.

(51) Int. Cl.
*A47J 27/00* (2006.01)
*H05B 6/10* (2006.01)

(52) U.S. Cl. ...................................... 392/441; 219/628

(58) Field of Classification Search ................. 392/441, 392/308–464; 199/73; 126/344–363; 119/73
See application file for complete search history.

(56) References Cited

U.S. PATENT DOCUMENTS

| | | | | |
|---|---|---|---|---|
| 2,721,922 | A | 10/1955 | Sciaky | 219/612 |
| 4,341,936 | A | 7/1982 | Virgin | |
| 4,560,849 | A | 12/1985 | Migliori et al. | |
| 4,638,135 | A | 1/1987 | Aoki | |
| 4,818,855 | A | 4/1989 | Mongeon et al. | 235/440 |
| 5,264,761 | A | 11/1993 | Johnson | 315/291 |
| 5,319,170 | A | 6/1994 | Cassidy | |
| 5,831,348 | A | 11/1998 | Nishizawa | |
| 5,925,278 | A | 7/1999 | Hirst | |
| 5,991,665 | A | 11/1999 | Wang et al. | 607/61 |
| 6,118,111 | A | 9/2000 | Price et al. | |
| 6,265,791 | B1 | 7/2001 | Eberl | |
| 6,621,985 | B1 | 9/2003 | Thweatt, Jr. | |
| 2004/0145342 | A1 | 7/2004 | Lyon | |

*Primary Examiner*—Daniel Robinson
(74) *Attorney, Agent, or Firm*—Warner Norcross & Judd LLP

(57) ABSTRACT

An inductively power heating system includes an inductive power source for supplying power to an inductive heater. The inductive heater may include a resistive heater and a multiple coil secondary. A heater control within the inductive heater may control the power supplied to the resistive heater, and thereby control the temperature of the resistive heater. The inductive heater may encapsulate the resistive heater, the multiple coil secondary and the heater control, thereby providing a sealed, inductive heater.

2 Claims, 4 Drawing Sheets

HEATING SYSTEM AND HEATER

This is a division of U.S. patent application Ser. No. 11/015,275, filed Dec. 17, 2004(now abandoned).

BACKGROUND OF THE INVENTION

Inductive electric heaters are in general use in several fields, such as medicine and printing. A heating slug of metal such as iron or steel is placed within proximity to an alternating electrical field. The alternating field induces currents within the slug, causing the slug to heat.

This type of electric heater has been used in a variety of different applications. For example, the arrangement is used in fluid heaters, such as the one shown in U.S. Pat. No. 6,118,111, entitled "Fluid Heater" and issued to Nigel Brent Price et al. U.S. Pat. No. 4,032,740 entitled "Two-level temperature control for induction heating" and issued to Eugene Mittelmann shows an induction heating apparatus for heating work pieces.

Inductive heating systems allow the heating of objects without providing electric current directly to the object or by running wires into the heating element, thereby allowing some degree of isolation of the heating slug from the rest of circuitry. However, such systems fail to provide sufficiently fine control of the temperature for some applications, and thereby limit their utility.

Thus, an improved induction heating system is highly desirable.

DETAILED DESCRIPTION OF THE DRAWINGS

Figure 1:
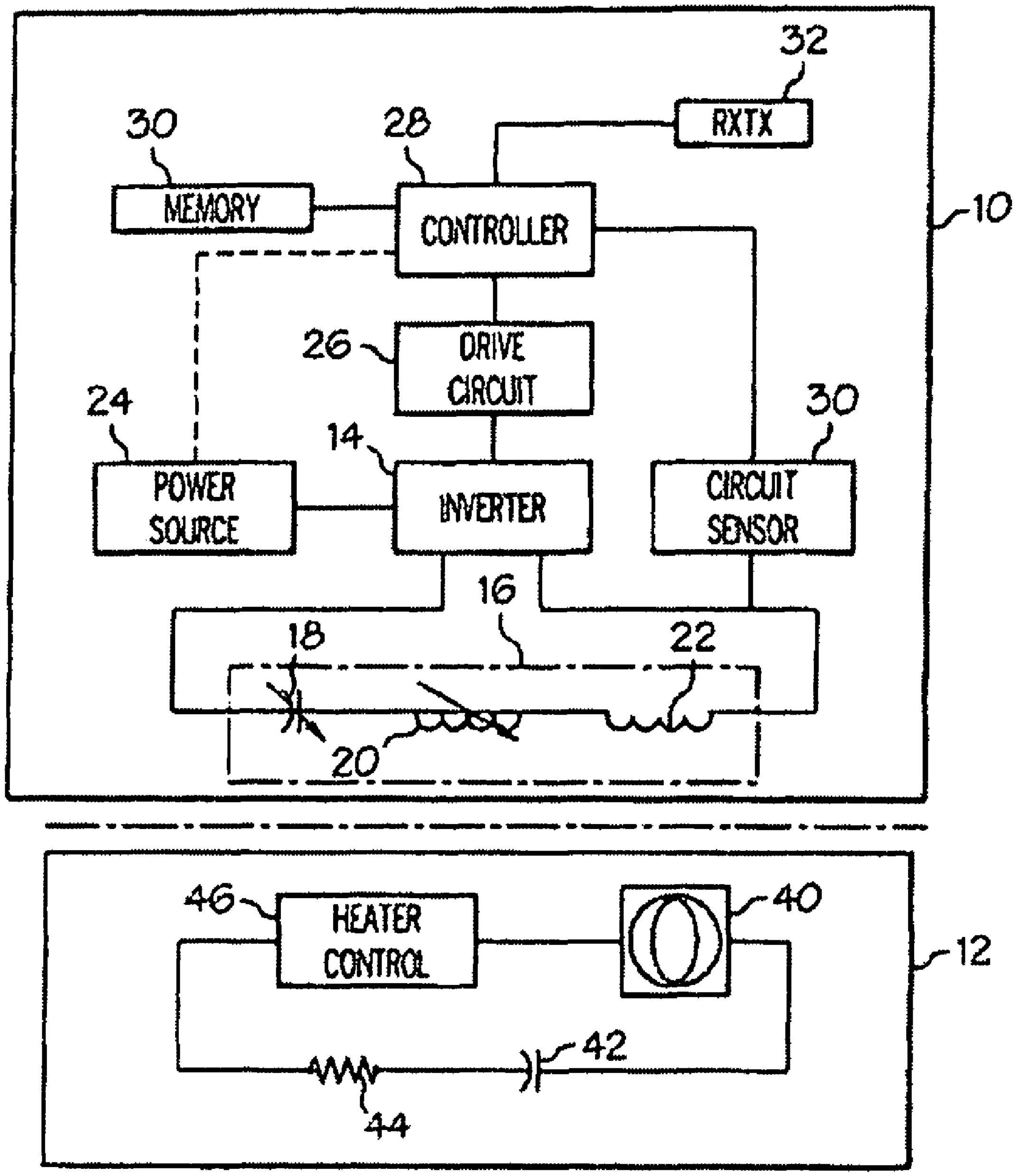
FIG. 1 shows an inductive heating system.

FIG. 1 shows an inductive heating system. Adaptive inductive power supply 10 provides power to inductive heater 12. The operation of adaptive inductive power supply 10 has been described fully in patent application Ser. No. 10/689,499 and patent application Ser. No. 10/689,148, assigned to the assignee of this application. Both applications are hereby incorporated by reference.

A short summary of the operation of adaptive inductive power supply 10 is provided. Inverter 14 supplies power to tank circuit 16. Tank circuit 16 is shown as a serial resonant tank circuit, but a parallel circuit tank circuit could also be used. Tank circuit 16 consists of tank capacitor 18, variable inductor 20 and tank inductor 22.

While variable inductor 20 and tank inductor 22 are shown as two separate inductors, one skilled in the art would recognize that a single variable inductor could be substituted for the two. Alternatively, a single fixed inductor could be used rather than a variable inductor. Similarly, tank capacitor 18 could be either variable or fixed.

Power source 24 energizes inverter 14. Drive circuit 26 controls the duty cycle and frequency of inverter 14. Controller 28 controls drive circuit 26 as well as tank capacitor 18 and variable inductor 20.

Circuit sensor 30 provides information regarding the operation of tank circuit 16 to controller 28. Memory 30 stores information relating to the operation of power supply 10 as well as information regarding any devices supplied power by power supply 10. Transceiver 32 is provided to allow communication between controller 28 and any external devices. The external devices could be devices powered by power supply 10 or the external devices could be a computer or a network. While transceiver 32 is shown for sending and receiving communication, transceiver 32 could be either a transmitter or a receiver.

Inductive heater 12 is comprised of a multiple coil secondary 40. Multiple coil secondary 40 has been described in more detail in patent application Ser. No. 10/689,224, assigned to the assignee of this application which is hereby incorporated by reference. Multiple coil secondary 40 is an inductive secondary allowing inductive heater 12 to be powered by power supply 10 irregardless of the orientation of secondary 40 with respect to power supply 10. Alternatively, secondary 40 could be comprised of a single coil.

Inductive heater capacitor 42 may be used to balance the impedance of inductive heater 12 so that optimum power transfer may occur. Heater resistor 44 heats when a sufficient electric current is applied. Heater control 46 regulates the current supplied to heater resistor 44, and thus regulates the heat generated by heater resistor 44. Heater control 46 could be a thermostat or a more complicated control.

If heater resistor 44 was a self-limiting resistor, a heater control could be optional. A self-limiting heater adjusts the energy generated in relation to the surface temperature and ambient temperature. As the temperature increases the resistance within the heater increases, thus decreasing the wattage output.

Inductive heater 12 could be within an enclosure such that no component of inductive heater 12 would extend out of the enclosure. The enclosure could also be hermetically sealed. Alternatively, all of the components of inductive heater 42 could be integrally molded together in a casing material such as a thermally conductive plastic, such as CoolPoly Elastomer, manufactured by Cool Polymers, Inc., Warwick, R.I. Some thermally conductive such as CoolPoly D-Series polymers also provide electrical isolation. Suitable materials are liquid crystalline polymer and polyphenylene sulfide.

Heater resistor 44 could be one of several different devices. For example, it could be a self-limiting parallel circuit heating tape, such as the one sold by Bartec U.S. Corporation, Tulsa, Okla.; heating tape, sold by HTS/Amptek Company, Stafford, Tex.; insulated resistance wire, such as those sold by HTS/Amptek Company, Stafford, Tex.; flexible foil heaters, such as those sold by Minco Products, Inc., Minneapolis, Minn.; wire-wound rubber heaters, such as Minco Products, Inc., Minneapolis, Minn.; Omegalux Kapton Insulated Flexible Heaters, sold by Omega Engineering, Inc., Stamford, Conn.; or Omegalux Silicon Rubber Heaters, sold by Omega Engineering, Inc., Stamford, Conn.

Figure 2:
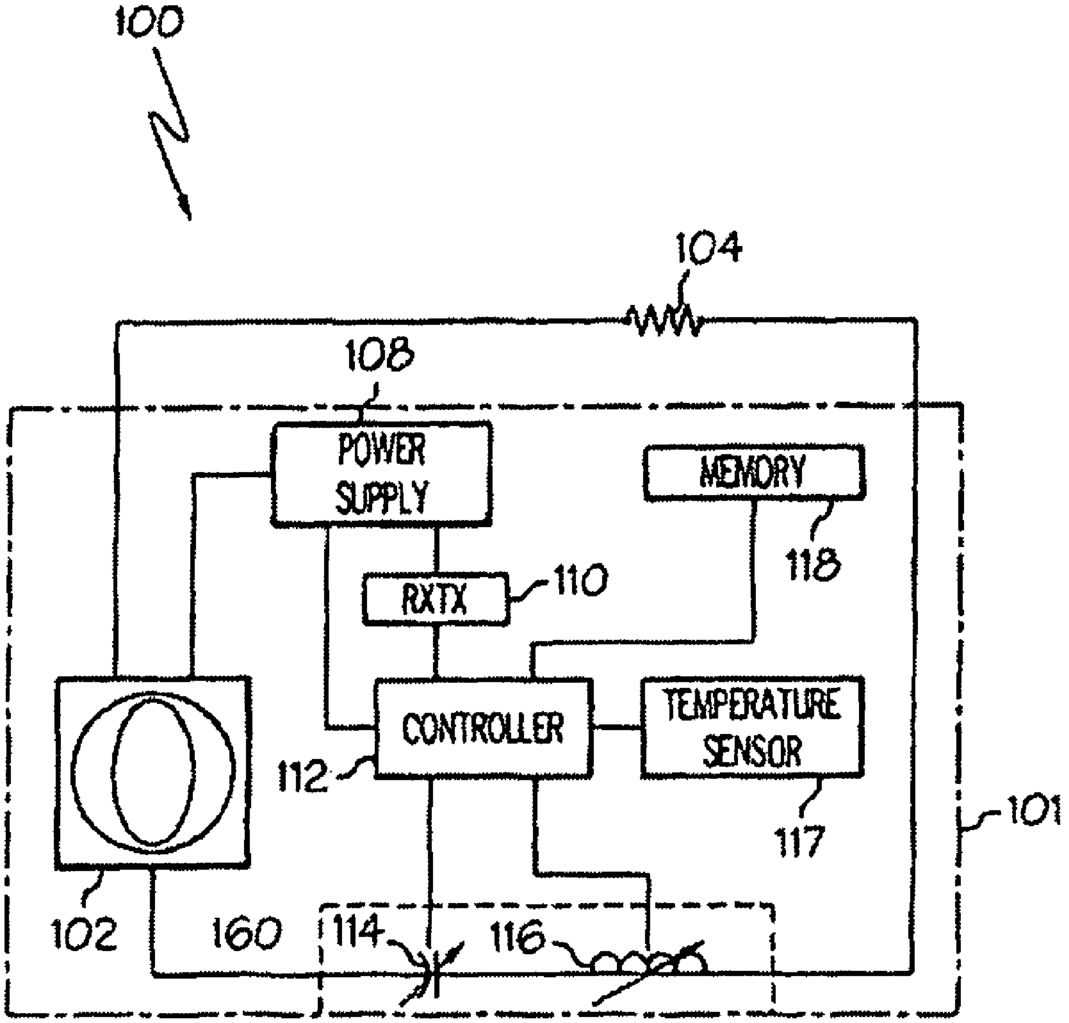
FIG. 2 shows a different embodiment for the circuit used within inductive heater.

FIG. 2 shows another embodiment for the circuit used within inductive heater 12. Inductive heater circuit 100 consists of heater control 101 attached to heater element 104. Inductive heater 12 includes a multiple coil secondary 102 coupled with heater element 104 and tank circuit 106. Multiple coil secondary 102 supplies power to power supply 108. Alternatively, secondary 120 could be single coil. Power supply 108 is then used to energize heater transceiver 110 and controller 112. Controller 112 controls the setting for variable capacitor 114 and variable inductor 116 to maximize the total efficiency of inductive power supply 10. Temperature sensor 117 provides information regarding the temperature of the inductive heater to controller 112. Tank circuit 106 is shown as a series resonant circuit. As is well known in the art, a parallel resonant circuit could be used in its stead.

Transceiver 110 could be a wireless transmission device using a protocol such as Bluetooth, cellular, or IEEE 801.11. Alternatively transceiver 110 could be either and active or passive RFID device. Transceiver 110 may be used by the controller to send information from temperature sensor 117 to power supply 108. While transceiver 110 is shown for sending and receiving communication, transceiver 32 could be a transmitter or a receiver.

Memory 118 may be used by controller 112 to control the operation of the heater. Additionally, memory 118 may include a unique identifier for the heater, or a range of operating temperatures used by controller 112 to control operation of the heater.

Figure 3:
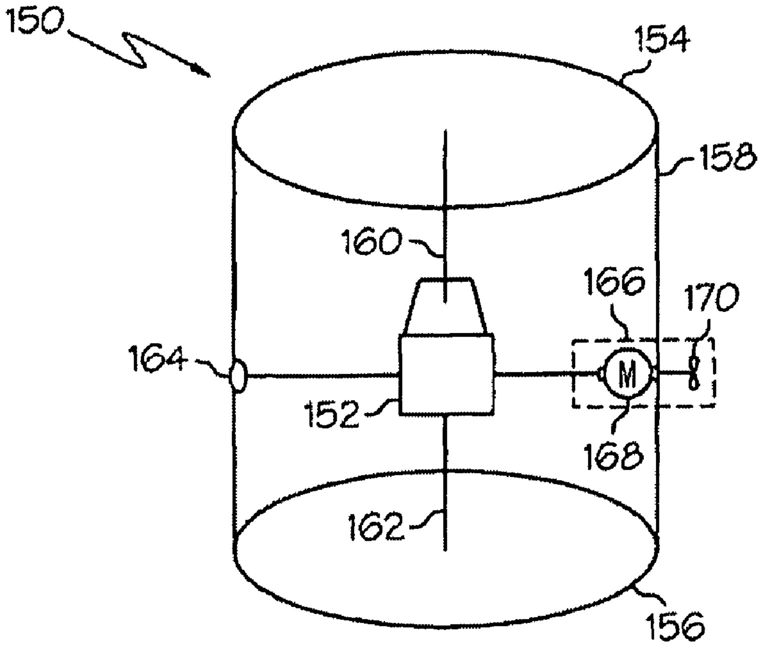
FIG. 3 shows inductive heater.

FIG. 3 shows inductive heater 150. Inductive heater 150 includes an inductive heater control 152 and two heating elements 154, 156. The two heating elements are affixed to the ends of enclosure 158. Leads 160, 162 extend to heater control 152 from heating elements 154, 156.

Heating elements 154, 156 can be affixed either to the exterior of enclosure 158, in which case the leads would extend though wall of enclosure 158. Alternatively, heating elements 154, 156 could be affixed to the interior of enclosure 158, in which case leads 160, 162 would not have to penetrate the wall of enclosure 158.

Enclosure 158 is shown as a cylinder. Obviously, other geometrical configurations for enclosure 158 are possible, such as a sphere or a cube. Enclosure 158 could be partially empty other than for heater control 152. Alternatively, enclosure 158 could be a solid.

Heating elements 154, 156 are shown as affixed to opposite sides of enclosure 158. Additional heating elements could be disposed on the exterior of enclosure 158, or only a single heating element could be used. For example, a single heating element could be disposed about the central portion of enclosure 158 rather than having a heating element at each end of enclosure 158.

Heat sink 164 is located near the surface of enclosure 158. It is made of a material such as copper so as to assist in the accurate determination of the temperature outside of enclosure 158. Heat sink 164 is coupled to heater control 152 to allow monitoring by heater control 152 of temperatures exterior to inductive heater 150.

Inductive heater 150 could be provided with propulsion system 166. If inductive heater 150 were for use within a fluid, propulsion system 166 would allow the movement of inductive heater 150 within the fluid. Propulsion system 166 is shown as electric motor 168 and propeller 170. Obviously, propulsion system 166 could also be any one of a variety of methods such as a turbine or fan. Alternatively, propulsion system 166 could be used to circulate fluid around heater 150.

Figure 4:
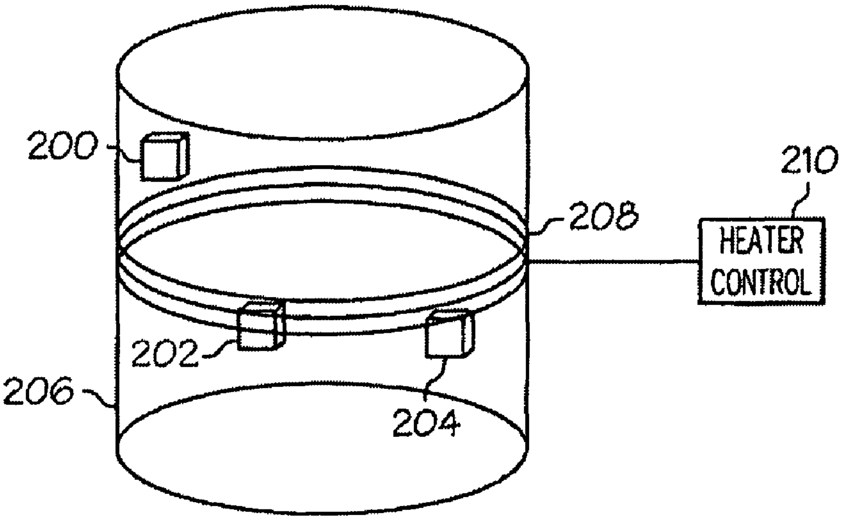
FIG. 4 shows a plurality of heaters suspended within the container.

FIG. 4 shows a plurality of heaters 200, 202, 204 suspended within container 206. Heaters 200, 202, 204 are shown as cubical heaters. Heaters 200, 202, 204 could be cylindrical, spherical, or any other suitable shape. The heating element for heaters 200, 202, 204 could be on one or more surfaces of heaters 200, 202, 204.

Inductive primary 208 is disposed about container 206. Inductive primary 208 could be disposed at the base of container 206 or the top of container 206. Heater control 210 could be the same or similar to inductive power supply 10 of FIG. 1.

If heaters 200, 202, 204 and heater control 210 were supplied with transceivers, heater control 210 could energize the heaters to maintain the contents of container 206 at a desired temperature. When supplied with temperature sensors, heaters 200, 202, 204 send information regarding the temperature within container 206 could be provided to heater control 210. Thus, heater control could also monitor the temperature of the contents of container 206.

Figure 5:
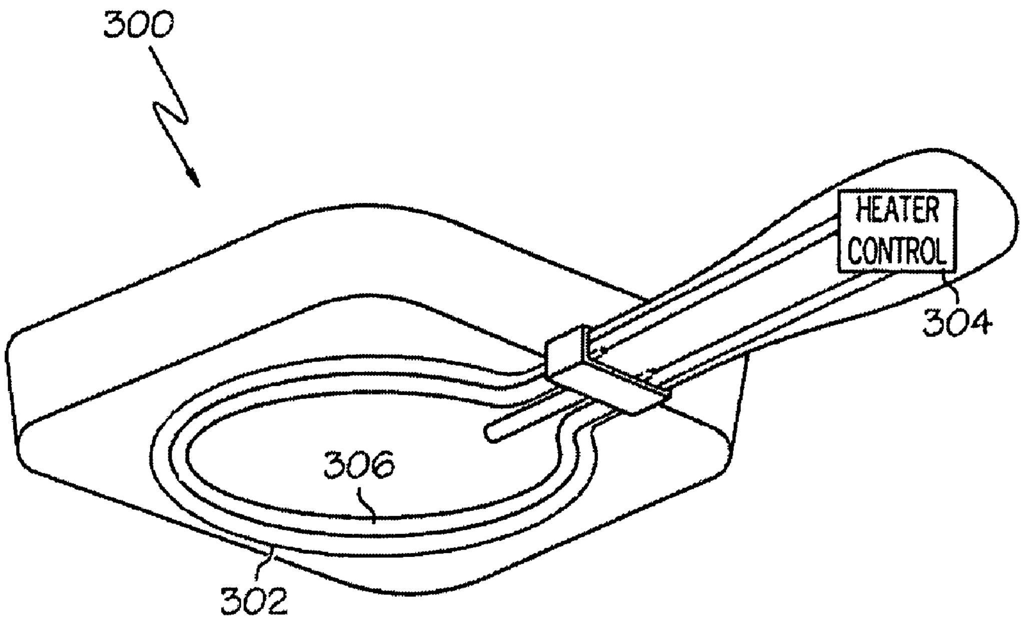
FIG. 5 shows an electric frying pan using an inductive heating system.

The heaters described herein could be used in a variety of applications. FIG. 5 shows electric frying pan 300. Frying pan 300 has inductive secondary 302 attached to heater control 304. Heater control 304 is coupled to heating element 306. When placed near an inductive ballast, inductive secondary 302 energizes heating element 306. Heater control 304, located in the handle of electric frying pan 300, regulates the energy supplied to heating element 306, and thereby controls the temperature within electric frying pan 300.

Figure 6:
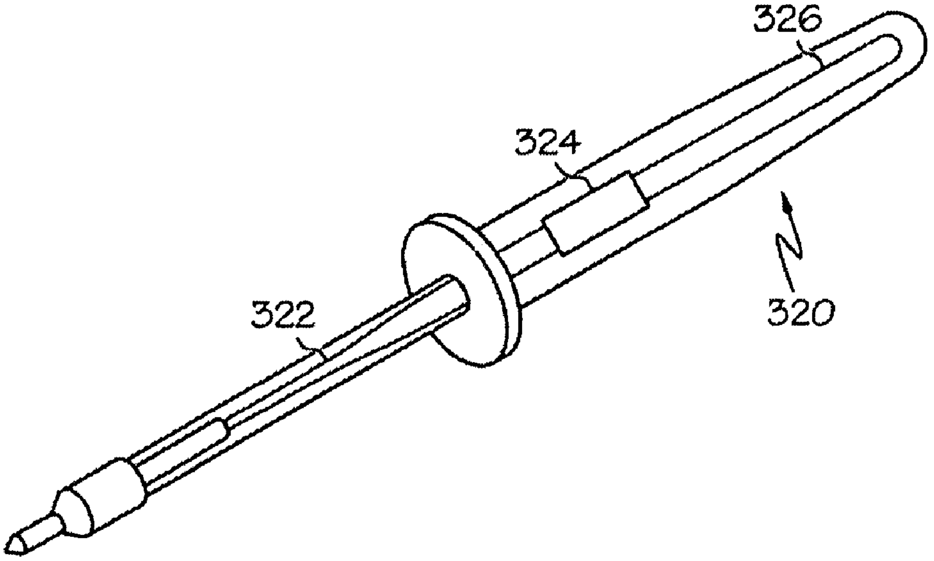
FIG. 6 shows a soldering iron using an inductive heating system.

FIG. 6 shows soldering iron 320. Heating element 322 is coupled to controller 324. Controller 324 is located in the handle of soldering iron 320. Inductive secondary 326 is disposed within the handle of soldering iron 320. When inductive secondary 326 is energized, heater control 324 provisions electrical energy to heating element 322.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. A method for heating a device comprising the steps of:
physically coupling an electrically resistive heating element with the device;
electrically coupling the electrically resistive heating element with one or more inductive secondary coils; and
enclosing the secondary coil and the electrically resistive heating element such that the enclosure is fully sealed and unpenetrated;
controlling energization of the electrically resistive heating element with a heater control:
altering power transferred from a primary to the inductive secondary coil with an adjustable impedance;
coupling a temperature sensor with the heater control;
controlling the adjustable impedance with a controller responding to the temperature sensor;
controlling an electric current in response to the controller operating responsive to instructions received from a receiver coupled to the controller to change the adjustable impedance;
transmitting information from the temperature sensor to the controller from a transmitter physically coupled to the temperature sensor; and
moving the inductively powered heater with a propulsion system including an electric motor.

2. A method for heating a device comprising the steps of:
physically coupling a heating element with the device;
coupling to and positioning the heating element around an inductive secondary, both within a fully sealed and unpenetrated enclosure;
making the enclosure an elastomeric material which is a thermally conductive polymer; and
making the conductive polymer out of liquid crystalline polymer and polyphenylene sulfide.

* * * * *